United States Patent [19]

Fujishiro et al.

[11] 3,882,451

[45] May 6, 1975

[54] VEHICULAR CATALYTIC CONVERTER FAILURE ALARM SYSTEM

[75] Inventors: Takeshi Fujishiro; Kenji Masaki, both of Yokohama; Kiyoshi Wazawa, Fujisawa, all of Japan

[73] Assignee: Nissan Motor Company Limited, Yokohama, Japan

[22] Filed: Sept. 13, 1973

[21] Appl. No.: 396,683

[30] Foreign Application Priority Data

Sept. 14, 1972 Japan................................. 47-92275

[52] U.S. Cl.................. 340/57; 73/346; 123/198 R; 340/228 R
[51] Int. Cl.............................................. B60q 1/00
[58] Field of Search....... 340/57, 228 R; 123/198 R; 23/288 F; 73/346, 116

[56] References Cited
UNITED STATES PATENTS

| | | | |
|---|---|---|---|
| 3,072,457 | 1/1963 | Bloch | 23/288 F |
| 3,503,716 | 3/1970 | Berger | 23/288 F |
| 3,723,070 | 3/1973 | Houdry | 23/288 F |

*Primary Examiner*—Glen R. Swann, III

[57] ABSTRACT

First and second temperature detectors respectively detect the temperatures of the exhaust gases in a vehicle exhaust system catalytic inlet and outlet ports of the converter. A first comparator produces a operating temperature signal when the voltage of the inlet temperature signal from the first temperature detector exceeds a first predetermined level. A difference signal generator produces a difference signal representing the difference of the inlet and outlet temperatures of the converter in accordance with the inlet and outlet temperature signals from the detectors, a second comparator produces a degradation signal when the voltage of the difference signal is lower than a second predetermined level, an AND gate produces an alarm signal when the pedestal and degradation signals are applied thereto. An alarm device provides an indication when the alarm signal is applied thereto.

8 Claims, 2 Drawing Figures

VEHICULAR CATALYTIC CONVERTER FAILURE ALARM SYSTEM

BACKGROUND OF THE INVENTION

The present invention relates to an alarm system for a motor vehicle, and more particularly to a failure alarm system for a catalytic converter of an exhaust gas purification system installed in a motor vehicle.

In order to eliminate toxic compounds such as carbon monoxide and hydrocarbons from exhaust gases, an exhaust gas purification system may be installed in a motor vehicle. An exhaust gas purificatioon system may comprise not only a catalytic converter disposed in the exhaust system, but also several subsidiary systems such as a secondary air supply system, fuel supply system, ignition timing control system etc. These subsidiary systems and catalytic converter cooperate with one another to perform exhaust gas purification. The catalytic converter cannot satisfactorily function if the subsidiary systems malfunction or the catalyst of the converter is degraded by aging or overheating. Since the catalytic converter plays an important role in the exhaust gas purification system, it is necessary to determine whether the converter is active enough to convert the toxic compounds into harmless materials.

The purpose of the present invention is therefore to provide a catalytic converter failure alarm system for an exhaust gas purification system installed in a motor vehicle.

SUMMARY OF THE INVENTION

A catalytic converter failure alarm system according to the invention utilizes the fact that a difference between the exhaust gas temperature at the inlet and outlet ports of the converter is large due to heat of reaction in the converter when the converter is sufficiently active, but the difference is small when the converter fails or is degraded.

According to the present invention, the above purpose is achieved by a catalytic converter failure alarm system which comprises a first temperature sensor to produce an inlet temperature signal analogous to the temperature of the exhaust gas at the inlet port of the converter, a second temperature sensor to produce an outlet temperature signal analogous to the temperature of the exhaust gas at the outlet port of the converter, a first comparator to produce an operating temperature signal when the voltage of the inlet temperature signal exceeds a first predetermined value, a difference signal amplifier to produce a difference signal analogous to the difference between the inlet and outlet temperatures represented by the inlet and outlet temperature signals, a second comparator to produce a failure signal when the voltage of the difference signal is below a second predetermined value, an AND gate to produce an alarm signal when the operating temperature signal and the failure signal are applied simultaneously thereto, and an alarm which is energized when the alarm signal is applied thereto.

BRIEF DESCRIPTION OF THE DRAWING

A preferred embodiment of the present invention is illustrated in the accompanying drawings in which.

DESCRIPTION OF THE PREFERRED EMBODIMENT

Figure 1:
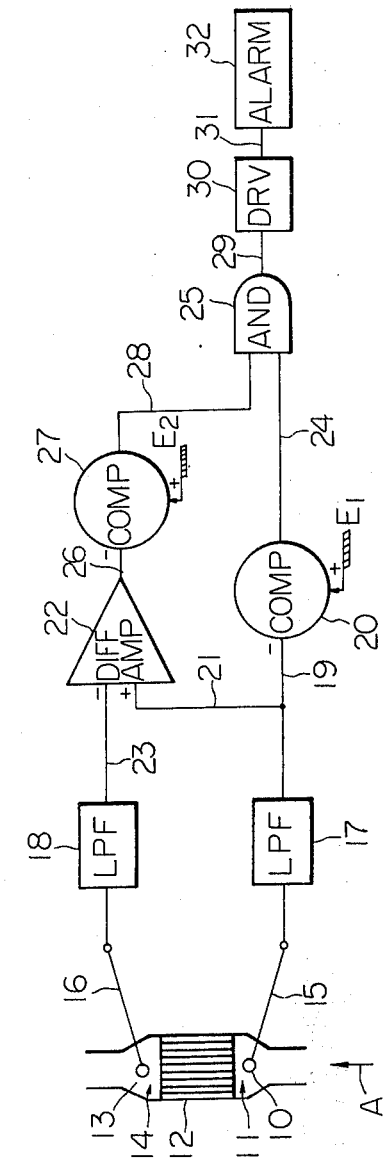
FIG. 1 is a schematic block diagram of a catalytic converter failure alarm system according to the invention.

Referring now to the drawings and more particularly to FIG. 1, a catalytic converter failure alarm system of the invention comprises a first temperature sensor 10 which is disposed in an inlet port 11 of a catalytic converter 12 installed in a motor vehicle exhaust system (not shown) in which exhaust gas flow is indicated by an arrow A. A second temperature sensor 13 is disposed in an outlet port 14 of the converter 12. The first and second temperature sensors 10 and 13 respectively produce at output terminals 15 and 16 thereof electric inlet and outlet temperature signals representing sensed temperatures. The output terminals 15 and 16 of the sensors 10 and 13 are connected to inputs of active low pass filters 17 and 18, which are capable of attenuating unwanted noises superposed on the temperature signals from the detectors 10 and 13 and amplifying the temperature signals. The output of the low pass filter 17 is connected through a line 19 to one input of a first comparator 20 and through a line 21 to one input of a difference signal amplifier 22. An output of the low pass filter 18 is connected through a line 23 to another input of the difference signal amplifier 22. The first comparator 20 receives at another input thereof a constant voltage having a first predetermined value $E_1$, and produces an operating temperature signal output when the voltage of the inlet temperature signal from the filter 17 exceeds the first predetermined value $E_1$. The output of the comparator 20 is connected through a line 24 to an input of an AND gate 25. The difference signal amplifier 22 produces a difference signal output representing the difference in voltage between the received signals from the low pass filters 17 and 18 which is transmitted through a line 26 to one input of a second comparator 27. The comparator 27 receives at another input thereof a constant voltage having a second predetermined value $E_2$, and produces a failure signal output when the difference signal voltage is lower than the second predetermined value $E_2$. The output of the comparator 27 is connected through a line 28 to another input of the AND gate 25, which produces an alarm signal when the operating temperature signal and the failure signal are simultaneously applied thereto. The output of the AND gate is connected through a line 29 to a driver 30 which produces a drive signal when the alarm signal is applied thereto. The output of the driver 30 is connected through a line 31 to an alarm 32 such as a buzzer.

Before the engine is warmed up, the temperature of exhaust gas at the inlet port 11 is lower than the activation or operating temperature of the catalyst of the converter 12 so that the output voltage of the low pass filter 17 is lower than the value $E_1$, whereby the comparator 20 does not produce the operating temperature signal. In this case, the AND gate 25 does not produce the alarm signal even if the failure signal from the comparator 27 is applied thereto through the line 28.

When the engine is warmed up and the temperature of exhaust gas at the inlet port 11 becomes higher than the activation temperature of the catalyst, the output voltage of the low pass filter 17 exceeds the value $E_1$, so that the comparator 20 produces the operating temperature signal which is then applied to the AND gate 25. Simultaneously, if the catalyst converter 12 is sufficiently active and operating normally, the difference signal voltage from the difference signal amplifier 22 is higher than the value $E_2$, so that the comparator 27 does not produce the failure signal. Conversely, if the converter 12 is degraded by aging, etc., or is inactive due to failure of a subsidiary system, the difference between the temperature of exhaust gas at the inlet port 11 and the outlet port 14 is small so that the difference signal voltage from the difference signal amplifier 22 is lower than the value $E_2$, whereby the comparator 27 produces the failure signal. The failure signal is applied to the AND gate 25 which then feeds the alarm signal out through the line 29. When the drive circuit 30 receives the alarm signal, it produces the drive signal which energizes the alarm 32.

Thus, the alarm 32 will be energized if the engine has reached a normal operating temperature (as sensed by the sensor 10), and a failure of the exhaust purifying system has occurred (as determined by the voltage difference between the outputs of the sensors 10 and 13).

Figure 2:
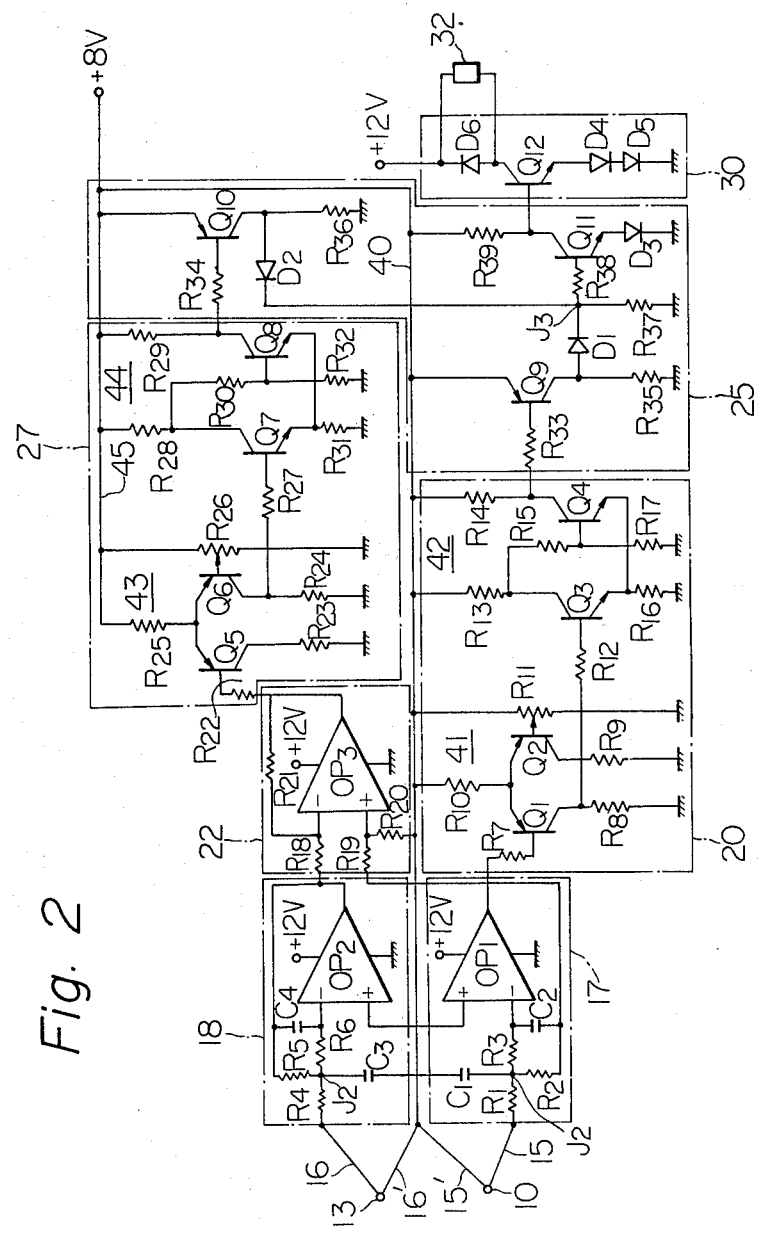
FIG. 2 is a schematic circuit diagram of the alarm system of FIG. 1.

In FIG. 2, there is shown a preferred circuit arrangement of the alarm system described in conjunction with FIG. 1. The temperature sensors 10 and 13 have output terminals 15 and 15' and 16 and 16', respectively, and the resistance of each sensor 10 and 13 varies in accordance with the sensed temperature. The terminals 15' and 16' are connected through a power line 40 to a +8V output terminal of an electric power source (not shown). The low pass filter 17 includes an operational amplifier $OP_1$ connected to a +12 output terminal of the power source. A positive terminal of the operational amplifier $OP_1$ is connected to the power line 40 and a negative terminal to the terminal 15 through resistors $R_1$ and $R_3$ which are connected in series at a junction $J_1$. The junction $J_1$ is connected through a capacitor $C_1$ to the power line 40. A resistor $R_2$ connects the junction $J_1$ to an output terminal of the operational amplifier $OP_1$ to form a feed-back circuit in conjunction with a capacitor $C_2$ connected as shown. The cut-off frequency of the low pass filter 17 is dependent upon the values of the resistors $R_1$, $R_2$ and $R_3$ and the capacitors $C_1$ and $C_2$ and may be, for example, 12 decible per octane (db/oct.). The filter 17 accordingly produces an output signal of about one volt which does not include unwanted high frequency noise.

The low pass filter 18 includes an operational amplifier $OP_2$ which is energized by a voltage of +12V from the power source. A positive terminal of the operational amplifier $OP_2$ is connected to the power line 40. A negative terminal of the amplifier $OP_2$ is connected to the output terminal 16 of the sensor 13 through resistors $R_4$ and $R_6$ connected in series at a junction $J_2$. The junction $J_2$ is connected through a capacitor $C_3$ to the power line 40. A resistor $R_5$ connects the junction $J_2$ to an output terminal of the amplifier $OP_2$ to form a feed-back circuit in conjunction with a capacitor $C_4$ connected as shown. The low pass filter 18 functions similarly to the low pass filter 17.

The first comparator 20 essentially consists of a differential amplifier 41 and a Schmitt trigger 42. The differential amplifier 41 includes a PNP transistor $Q_1$ having a base connected through a resistor $R_7$ to the output terminal of the low pass filter 17 and a collector grounded through a resistor $R_8$. An emitter of the transistor $Q_1$ is connected through a resistor $R_{10}$ to the power line 40 and directly to an emitter of a PNP transistor $Q_2$. The transistor $Q_2$ has a collector grounded through a resistor $R_9$ and a base connected to a slider of a variable resistor $R_{11}$. One terminal of the resistor $R_{11}$ is connected to the power line 40 and the other terminal is connected to ground. The potential at the base of the transistor $Q_2$ is the voltage $E_1$ and is manually adjustable by means of the variable resistor $R_{11}$. The resistor $R_{11}$ thus acts as an adjustable D-C voltage source. The Schmitt trigger 42 includes an NPN transistor $Q_3$ which has a base connected through a resistor $R_{12}$ to the collector of the transistor $Q_1$. An emitter of the transistor $Q_3$ is grounded through a resistor $R_{16}$. A collector of the transistor $Q_3$ is connected through a resistor $R_{13}$ to the power line 40 and through a resistor $R_{15}$ to a base of a transistor $Q_4$. The base of the transistor $Q_4$ is grounded through a resistor $R_{17}$. The transistor $Q_4$ has a collector connected through a resistor $R_{14}$ to the power line 40 and an emitter connected directly to the emitter of the transistor $Q_3$. The potential at the base of the transistor $Q_2$ is, for example, so adjusted that a voltage appears at the collector of the transistor $Q_1$ analogous to the difference between the inlet temperature of the converter and the activation or operating temperature of the catalyst of the converter. When this voltage exceeds a certain level, the transistor $Q_4$ is turned OFF so that the potential at the collector of the transistor $Q_4$ rises to an "H" level. As a result, the comparator 20 produces an "H" level signal, or the operating temperature signal, when the input signal voltage from the low pass filter 17 exceeds the first predetermined value $E_1$. In this case, it is to be noted that drift current depending on temperature variations is effectively suppressed in the described design.

The difference signal amplifier 22 includes an operational amplifier $OP_3$ which is energized by a d-c voltage of +12V from the power source. A positive input terminal of the operational amplifier $OP_3$ is connected through a resistor $R_{19}$ to the output terminal of the filter 17 and through a resistor $R_{20}$ to the power line 40. A negative input terminal of the amplifier $OP_3$ is connected through a resistor $R_{18}$ to the output terminal of the filter 18 and through a resistor $R_{21}$ to an output terminal of the operational amplifier $OP_3$. As is well known in the art, the difference signal amplifier 22 produces an output signal having a voltage proportional to difference between the voltages of the input signals.

The second comparator 27 is similar to the first comparator 20 and essentially consists of a differential amplifier 43 and a Schmitt trigger 44. The differential amplifier 43 includes a PNP transistor $Q_5$ which has a base connected through a resistor $R_{22}$ to the output terminal of the difference signal amplifier 22 and a collector grounded through a resistor $R_{23}$. An emitter of the transistor $Q_5$ is connected through a resistor $R_{25}$ to a +8V power line 45 which is connected to the power line 40. The emitter of the transistor $Q_5$ is connected directly to an emitter of a PNP transistor $Q_6$ which has a collector grounded through a resistor $R_{24}$ and a base connected to a manually adjustable slider of a variable resistor $R_{26}$. The resistor $R_{26}$ has one terminal connected to the power line 45 and the other to ground. The voltage at the slider of the resistor $R_{26}$ has the second predetermined value $E_2$. The resistor $R_{26}$ thus acts as an adjustable d-c voltage source. The Schmitt trigger 44 includes an NPN transistor $Q_7$ having a base connected through a resistor $R_{27}$ to the collector of the transistor $Q_6$ and an emitter grounded through a resistor $R_{31}$. A collector of the transistor $Q_7$ is connected through a resistor $R_{28}$ to the power line 45 and through a resistor $R_{30}$ to a base of a transistor $Q_8$. The base of the transistor $Q_8$ is grounded through a resistor $R_{32}$. The transistor $Q_8$ has an emitter connected directly to the emitter of the transistor $Q_7$ and a collector connected through a resistor $R_{29}$ to the power line 45. The resistor $R_{26}$ is so adjusted that the transistor $Q_8$ of the Schmitt trigger 44 is turned OFF when the difference signal voltage applied to the base of the transistor $Q_5$ from the difference signal amplifier 22 is lower than the value $E_2$. Thus, the second comparator 27 produces an "H" level signal, or the failure signal, when the voltage of the difference signal is lower than the predetermined value $E_2$.

The AND gate 25 includes a PNP transistor $Q_9$ which has a base connected through a resistor $R_{33}$ to the output terminal of the first comparator 20 and a collector grounded through a resistor $R_{35}$. An emitter of the transistor $Q_9$ is connected directly to the power line 40. A PNP transistor $Q_{10}$ has a base connected through a resistor $R_{34}$ to the output terminal of the second comparator 27 and a collector grounded through a resistor $R_{36}$. An emitter of the transistor $Q_{10}$ is connected directly to the power line 45. An NPN transistor $Q_{11}$ has a base grounded through resistors $R_{38}$ and $R_{37}$ which are connected in series at a junction $J_3$. The collectors of the transistors $Q_9$ and $Q_{10}$ are respectively connected through diodes $D_1$ and $D_2$ to the junction $J_3$ as shown. An emitter of the transistor $Q_{11}$ is grounded through a diode $D_3$ as shown. A collector of the transistor $Q_{11}$ is connected through a resistor $R_{39}$ to the power line 40.

When, in operation, "H" level signals are applied from the first and second comparators 20 and 27 to the transistors $Q_9$ and $Q_{10}$, the transistors $Q_9$ and $Q_{10}$ become non-conductive, so that the transistor $Q_{11}$ becomes non-conductive, whereby an "H" level signal appears at the collector of the transistor $Q_{11}$. If either of the comparators 20 and 27 produces an "L" signal, the respective transistor $Q_9$ or $Q_{10}$ becomes conductive so that one of the diodes $D_1$ and $D_2$ is forward biased, whereby the transistor $Q_{11}$ conducts.

It is now to be noted that the diode $D_3$ is effective in compensating for the forward voltage drop across the diodes $D_1$ or $D_2$.

The drive circuit 30 includes a power transistor $Q_{12}$ which has a base connected directly to the collector of the transistor $Q_{11}$ and an emitter grounded through diodes $D_4$ and $D_5$ connected in series as shown. A collector of the transistor $Q_{12}$ is connected to an anode of a diode $D_6$ a cathode of which is connected to the +12VDC output terminal of the power source. The diodes $D_4$ and $D_5$ are effective in ensuring the switching operation of the transistor $Q_{12}$ and in compensating for changes in the operating point of the transistor $Q_{12}$ due to changes in ambient temperature.

A solenoid (not shown) of the alarm 32 is connected across the diode $D_6$. The diode $D_6$ is effective in absorbing voltage surges caused by the inductance of the solenoid.

It is now apparent from the above description that since each of the first and second comparators 20 and 27 consists of a differential amplifier and a Schmitt trigger, it is possible to substantially vary the values $E_1$ and $E_2$ in consideration of the characteristics of the temperature sensors 10 and 13 of the alarm system and the properties of the catalytic material in the converter. An alarm system according to the present invention is therefore applicable not only to an exhaust gas purification system using a platinum element as a catalytic material, but also to exhaust gas purification systems using elements other than platinum.

It is to be noted that if an alarm system according to the invention utilizes semiconductive devices such as transistors and diodes which are susceptible to shock and vibration or changes in ambient temperature, the main components of the alarm system should be placed in a location remote from the converter by interconnecting the temperature sensors and low pass filters by means of long lines. In this case, the alarm system can operate accurately since unwanted external noises picked up by the long lines will be attenuated by the low pass filters.

It is further to be noted that employment of the Schmitt triggers in the comparators of the alarm system can eliminate a chattering phenomenon which would affect the durability of the alarm system.

It will be understood that the invention is not to be limited to the configuration shown and described and that various changes and modifications may be made without departing from the spirit and scope of the invention, as defined in the appended claims. Such modifications may include employment of high level IC or LSI elements in place of the elements comprising transistors and diodes described above.

What is claimed is:

1. A catalytic converter failure alarm system for a catalytic converter installed in a motor vehicle exhaust system which has an inlet port and an outlet port; the system comprising;

a first temperature sensor to produce an inlet temperature signal analogous to the temperature of exhaust gas at the inlet port of the converter;

a second temperature sensor to produce an outlet temperature signal analogous to the temperature of exhaust gas at the outlet port of the converter;

a first comparator to produce an operating temperature signal when the voltage of the inlet temperature signal exceeds a first predetermined value;

a difference signal amplifier to produce a difference signal analogous to the difference between the inlet and outlet temperatures of the converter as represented by the inlet and outlet temperature signals;

a second comparator to produce a failure signal when the voltage of the difference signal is below a second predetermined value;

an AND gate to produce an alarm signal when the operating temperature signal and the failure signal are applied simultaneously thereto; and an alarm which energizes in response to the alarm signal.

2. A catalytic converter failure alarm system as claimed in claim 1, in which said first temperature sensor is disposed in the inlet port of the converter to produce a signal having a voltage analogous to the sensed temperature, the system further comprising a low pass filter having the input side thereof connected to the output of said first temperature sensor and the output side thereof connected to one input terminal of said difference amplifier 3. A catalytic converter failure alarm system as claimed in claim 1, in which said second temperature sensor is disposed in the outlet port of the converter to produce a signal having a voltage analogous to the sensed temperature, the system further comprising a low pass filter having the input side thereof connected to the output of said second temperature sensor and the output side thereof connected to one input terminal of said difference amplifier.

4. A catalytic converter failure alarm system as claimed in claim 1, in which said difference signal amplifier has one input thereof connected to the output of said first temperature sensor and another input thereof connected to the output of said second temperature sensor.

5. A catalytic converter failure alarm system as claimed in claim 1, in which said first comparator includes a differential amplifier having one input thereof connected to the output of said first temperature sensor to receive said inlet temperature signal and another input thereof connected to an adjustable d-c voltage source, and a Schmitt trigger having an input thereof connected to the output of said differential amplifier.

6. A catalytic converter failure alarm system as claimed in claim 1, in which said second comparator includes a differential amplifier having one input thereof connected to the output of said difference signal amplifier and another input thereof connected to an adjustable d-c voltage source.

7. A catalytic converter failure alarm system as claimed in claim 1, in which said AND gate has one input thereof connected to the output of said first comparator and another input thereof connected to the output of said second comparator.

8. A catalytic converter failure alarm system as claimed in claim 1, in which said alarm includes a driver having an input thereof connected to the output of said AND gate.

* * * * *